United States Patent
Yeom et al.

(10) Patent No.: US 11,878,672 B2
(45) Date of Patent: Jan. 23, 2024

(54) METHOD OF EMERGENCY BRAKING OF VEHICLE

(71) Applicants: Hyundai Motor Company, Seoul (KR); Kia Corporation, Seoul (KR)

(72) Inventors: Myung-Ki Yeom, Incheon (KR); In-Su Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 323 days.

(21) Appl. No.: 17/466,561

(22) Filed: Sep. 3, 2021

(65) Prior Publication Data
US 2022/0203945 A1    Jun. 30, 2022

(30) Foreign Application Priority Data
Dec. 30, 2020    (KR) .................... 10-2020-0187708

(51) Int. Cl.
| | | |
|---|---|---|
| *B60T 7/08* | (2006.01) | |
| *B60T 8/172* | (2006.01) | |
| *B60T 8/171* | (2006.01) | |
| *B60K 35/00* | (2006.01) | |

(52) U.S. Cl.
CPC .............. *B60T 8/171* (2013.01); *B60K 35/00* (2013.01); *B60T 7/085* (2013.01); *B60K 2370/1464* (2019.05); *B60K 2370/1468* (2019.05); *B60K 2370/155* (2019.05);
(Continued)

(58) Field of Classification Search
CPC ...... B60K 2370/146; B60K 2370/1464; B60K 2370/1468; B60K 2370/1472; B60K 2370/1531; B60K 2370/155; B60K 2370/21; B60K 2370/29; B60K 2370/31;
(Continued)

(56) References Cited

U.S. PATENT DOCUMENTS

| | | | | |
|---|---|---|---|---|
| 11,079,753 | B1 * | 8/2021 | Roy | ...................... G05D 1/0278 |
| 2019/0302761 | A1 * | 10/2019 | Huang | .................. G05D 1/0221 |
| 2021/0331587 | A1 * | 10/2021 | Kim | ........................ B60R 11/04 |

(Continued)

FOREIGN PATENT DOCUMENTS

| | | |
|---|---|---|
| KR | 10-1317111 B1 | 10/2013 |
| KR | 10-1542986 B1 | 8/2015 |
| KR | 10-2018-0126707 A | 11/2018 |

OTHER PUBLICATIONS

KR-101542986-B1 (English translation) published Aug. 2015.*

*Primary Examiner* — Erick R Solis
(74) *Attorney, Agent, or Firm* — Morgan, Lewis & Bockius LLP

(57) ABSTRACT

A method of emergency braking of a vehicle includes: displaying a brake button in a vehicle; determining pre-touch information on a distance before the brake button is touched by a user; determining post-touch information on a distance after the brake button is touched; and performing any one of a first brake control in which general braking is performed according to the degree of the pressing of the brake button and braking force is added from a first time point after the brake button is pressed, a second brake control in which the general braking is performed and braking force is added from a second time point that is after the first time point, and a third brake control in which the general braking is performed according to the pre-touch information and the post-touch information.

13 Claims, 6 Drawing Sheets

(52) U.S. Cl.
CPC .. *B60K 2370/1531* (2019.05); *B60K 2370/29* (2019.05); *B60K 2370/31* (2019.05); *B60T 2201/03* (2013.01)

(58) Field of Classification Search
CPC ......... B60K 35/00; B60T 7/085; B60T 8/171; B60T 8/172; B60T 2201/02
USPC .............................................. 701/70, 77, 78
See application file for complete search history.

(56) References Cited

U.S. PATENT DOCUMENTS

2022/0101611 A1\* 3/2022 Lee .................... G02B 27/0093
2022/0185306 A1\* 6/2022 Yeom ................ B60W 60/0054

\* cited by examiner

FIG. 2A
FIG. 2B
FIG. 2C
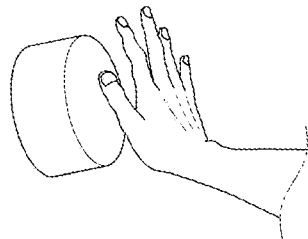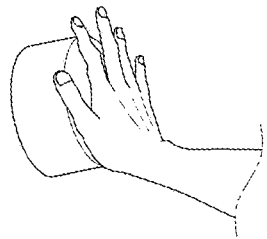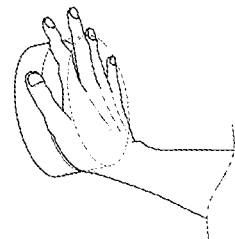
FIG. 3
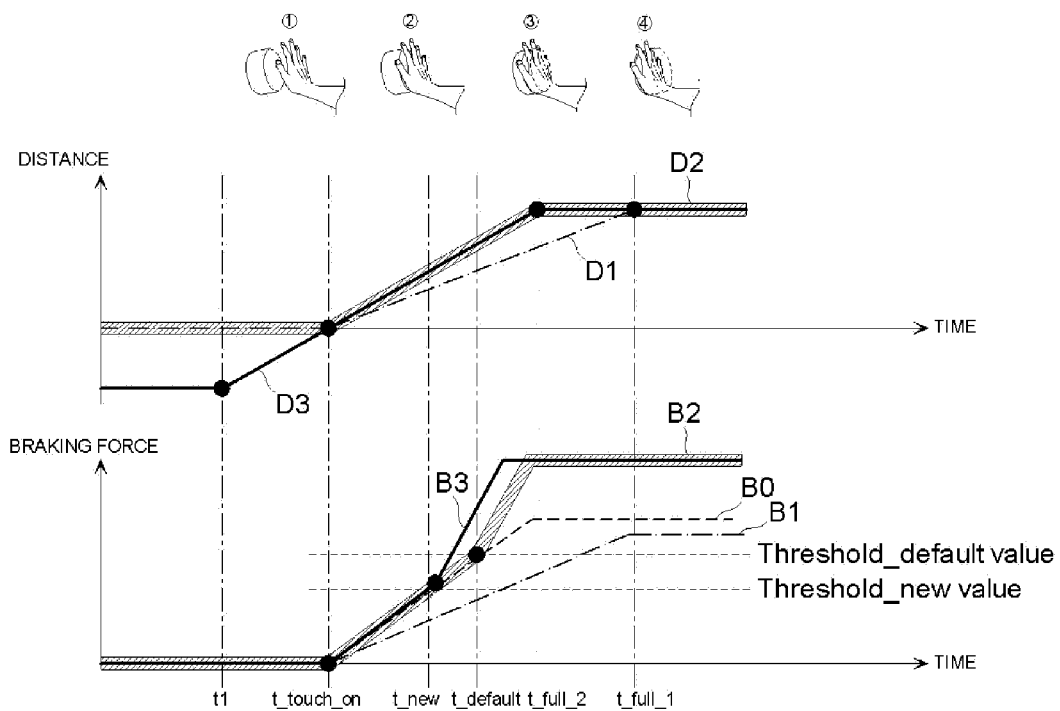

METHOD OF EMERGENCY BRAKING OF VEHICLE

CROSS-REFERENCE TO RELATED APPLICATIONS

This application claims the benefit of priority to to Korean Patent Application No. 10-2020-0187708, filed on Dec. 30, 2020, in the Korean Intellectual Property Office, the disclosure of which is incorporated herein by reference in its entirety.

TECHNICAL FIELD

The present disclosure relates to a method of emergency braking of a vehicle, and more particularly, to a method of performing braking control according to the degree of emergency braking intention of a user in consideration of both pre-touch information and post-touch information when the user touches a hologram brake button that is three-dimensionally implemented in a vehicle.

BACKGROUND

An autonomous vehicle is a vehicle which recognizes a driving environment and determines danger, plans a driving route to minimize driver's driving manipulation, and operates safely by itself even though a driver does not directly operate the vehicle.

In the meantime, in the autonomous vehicle, vehicle driving control, such as steering, acceleration, and braking, may be performed in a manual driving mode or an autonomous driving mode. In this case, in order to maximally secure an internal space of the vehicle so as for a passenger in the vehicle to do personal work, take a rest, or the like in the autonomous driving mode, there is a need for the steering wheel, acceleration and braking pedal, and the like to exist in a hidden state and then appear to the driver or the passenger in an emergency situation or the manual driving mode. In order to implement the technology, it is possible to implement the configurations, such as the steering wheel and the acceleration and braking pedal, required for the vehicle driving control in the form of a hologram.

In particular, a passenger wearing a Hololens can view holographic images that are three-dimensionally projected into the inner space of the vehicle, and the steering wheel, the acceleration and braking pedals, and the like are manufactured in hologram images. The Hololens is a Head Mounted Display (HMD) worn on the head, and is a mixed reality-based wearable device. If a Virtual Reality (VR) device, such as Oculus Rift or HTC, vibe implements VR through a separate display that completely blocks the field of view, the Hololens enables a user to see a surrounding environment of the user through a translucent display, so that the Hololens is different from the VR device. That is, the Hololens using a window holograph technology means Mixed Reality (MR) which may output a scanned 3D image of an actual object on a real screen and freely manipulate the 3D image, unlike the VR that shows a complete virtual screen or Augmented Reality (AR) that superimposes an object on the real screen.

The Hololens is for Microsoft's "Windows 10" only. An API for developing an application program (app) for the Hololens is also embedded in Windows 10. That is, the app developed for the Hololens may be used together in various devices operating with Windows 10. A gesture manipulation technology that manipulates AR images with hand gestures is applied, and a voice recognition function is also installed so as to recognize a voice command of a user. Some of the contents of the technology for Microsoft's Hololens are disclosed through the following URL Address.

https://www.youtube.com/watch?v=d3YT8j0yY10
https://www.youtube.com/watch?v=uIHPPtPBgHk The related art of controlling vehicle travelling by displaying a hologram in a vehicle is disclosed in Korean Patent Application Laid-Open No. 10-2018-0126707 (Apparatus and Method of Controlling Hologram Display and Vehicle System). Korean Patent Application Laid-Open No. 10-2018-0126707 is the technology for controlling steering by manipulating a hologram image of a steering wheel, and is the technology of projecting a first hologram image corresponding to an image of an operation unit of a steering wheel to a predefined first region, and transmitting a control signal to a driving unit of a vehicle through recognition of a motion of manipulating a button in the first hologram image.

In the meantime, Brake Assist System (BAS) is disclosed as the technology for emergency braking of a vehicle in an emergency. The BAS is a braking assistant device which is capable of fully exhibiting braking performance by assisting force of pressing a brake pedal of a driver during sudden braking, and performs a function of adding braking force after the brake pedal is pressed. Korean Patent No. 10-1317111 (Vacuum Brake Booster provided with Mechanical Emergency Braking Assistant Device) is disclosed as the related art related to the BAS.

However, the disclosure, such as the BAS, for assisting braking force addition, does not consider information before a driver touches a brake, so that there is a possibility of a safety accident due to delay in braking time in an emergency situation where the vehicle must be braked urgently.

The foregoing explained as the background is intended merely to aid in the understanding of the background of the present disclosure, and is not intended to mean that the present disclosure falls within the purview of the related art that is already known to those skilled in the art.

SUMMARY

The present disclosure is conceived to solve the foregoing problems, and presents a new type of disclosure which implements a braking means, such as a brake, in a hologram image and is capable of advancing the time when additional braking force is generated by considering both the information before and after the braking means is touched.

An exemplary embodiment of the present disclosure provides a method of emergency braking of a vehicle, which includes a processor configured to perform functions of the method, including: a display operation for displaying a brake button in a vehicle; a pre-touch information determining operation for determining a degree of a first emergency braking intention before a user touches the brake button by using information on a pre-touch distance that is a distance between the brake button and a brake part of the user before the brake button is touched by the user and information on a change rate of the pre-touch distance; a post-touch information determining operation for determining a degree of a second emergency braking intention after the user touches the brake button by using information on a post-touch distance that is a pressing distance of the brake button by the user after the brake button is touched and information on a change rate of the post-touch distance; and a control operation for performing any one of a first brake control in which general braking is performed according to the degree of the pressing of the brake button and braking force is added from a first time point after the brake button is pressed, a second brake control in which the general braking is performed and braking force is added from a second time point that is after the first time point, and a third brake control in which the general braking is performed according to the pre-touch information and the post-touch information.

According to the present disclosure, the braking force generation control is performed by considering both the information before and after the touch of the brake button, so that it is possible to generate braking force from an early time in an emergency in which emergency braking is required, thereby preventing safety accidents.

According to the present disclosure, a position and a speed of a brake part of a driver can be determined before the driver touches a brake means, thereby rapidly determining an emergency braking intention of the driver.

It is possible to generate additional braking force at an earlier time point than that of the existing braking force assisting system, such as a Brake Assist System (BAS).

According to the present disclosure, the braking means is implemented in a hologram image, so that an internal space of the vehicle may be maximally utilized, such as the case where a passenger in a vehicle does personal work or takes a rest.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIGS. 2A, 2B and 2C are diagrams illustrating a brake button implemented in a hologram.

FIG. 3 is a graph illustrating a distance between a brake part of a user and a brake button, and a braking force relationship according to time.

Figure 1:
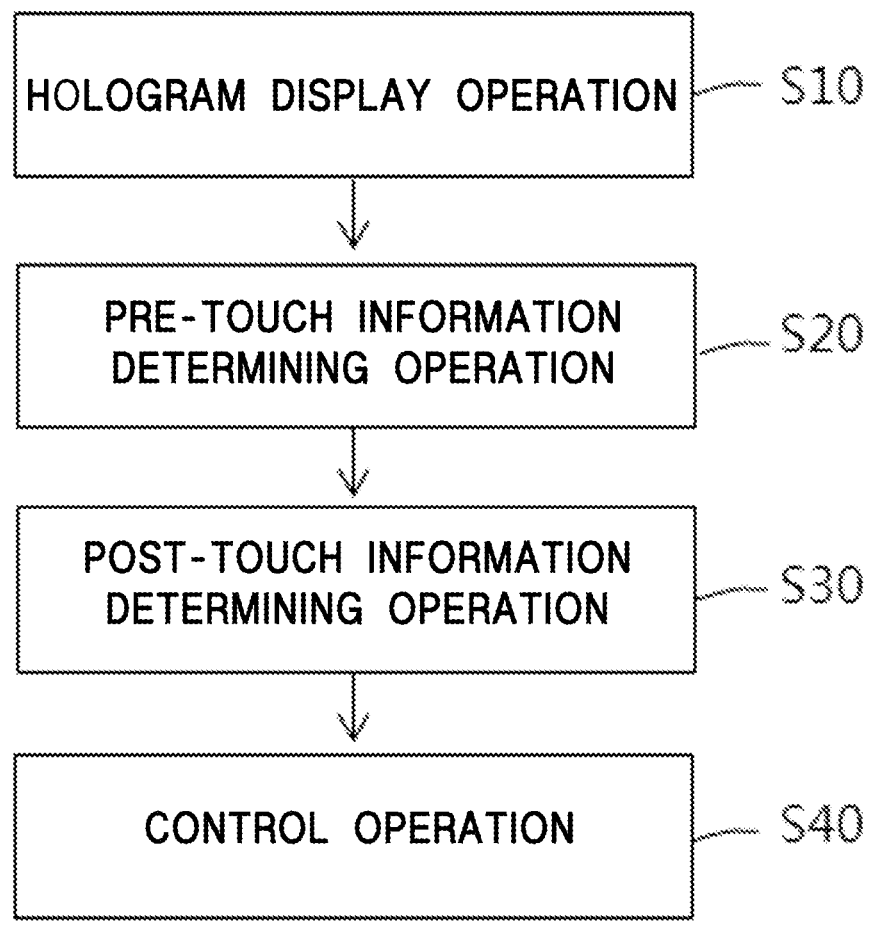
FIG. 1 is a schematic diagram illustrating a general operation of a method of emergency braking of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE EMBODIMENTS

Hereinafter, exemplary embodiments of a method of emergency braking of a vehicle according to the present disclosure will be described in detail with reference to the drawing. Terms or words used hereinafter shall not be interpreted to be limited as general or lexical meanings, and on the principle that the inventor can appropriately define a concept of a term for describing the disclosure by the best method, the terms or the words shall be interpreted as a meaning and a concept corresponding to the technical spirit of the present disclosure.

The present disclosure relates to a disclosure which recognizes an emergency braking intention of a driver by considering both information before and after touch of a brake when the driver of a vehicle performs braking control, and performs the braking control according to the recognized emergency braking intention.

FIG. 1 is a schematic diagram illustrating a general operation of a method of emergency braking of a vehicle according to an exemplary embodiment of the present disclosure.

As illustrated in FIG. 1, a method of emergency braking of a vehicle according to an exemplary embodiment of the present disclosure includes a hologram display operation S10, a pre-touch information determining operation S20, a post-touch information determining operation S30, and a control operation S40.

The hologram display operation S10 is an operation in which a braking means for a driver to perform braking control of the vehicle is implemented in a hologram and is displayed in the vehicle. In general, a mechanical braking means (for example, a brake pedal) is mounted in the vehicle, and when a driver touches the braking means, braking of the vehicle is performed. However, according to the exemplary embodiment of the present disclosure, the braking means is implemented in the hologram, so that it is possible to secure a sufficient space in the vehicle. The braking means implemented in the hologram may have various forms, but in the present specification, the case where the braking means is formed in the button type is described. The brake button may be touched by a body part (hereinafter, referred to as a brake part) of the driver for braking. Herein, the brake part of the driver is not limited. In the meantime, a person who is capable of touching the brake button may also include other people who have the authority to perform braking among the passengers in the vehicle, as well as the driver, so that in the present specification, a person who is capable of touching the brake button is expressed as a user.

In order to implement the brake button in the hologram image, a hologram device is used in the exemplary embodiment of the present disclosure. The hologram device controls the configuration required for the braking control of the vehicle to be implemented in a hologram image that is a virtual object. Further, the hologram device is interlocked with a braking system. The hologram image includes a user's gesture recognition region, and when the user makes a gesture in the recognition region of the hologram image, the hologram device recognizes the gesture of the user and applies a control signal to the braking system according to a change in a position of the gesture.

The configurations of the control device required for the gesture recognition or the braking control of the vehicle through the hologram may be implemented by the technology published before the filing date of the present disclosure. For example, for the technology for gesture recognition through a hologram and the technology for applying a control signal to each system required for braking control of a vehicle, the contents of the technology for the Hololens published by Microsoft, the contents of the technology, the technical contents for Korean Patent No. 10-1542986 (System for Recognizing Gesture by using Hologram, and Control Method thereof), and the like may be referred.

FIGS. 2A, 2B and 2C are diagrams illustrating a brake button implemented in a hologram. FIGS. 2A, 2B and 2C illustrate a distance relationship between the brake part of the user and the brake button. In particular, FIG. 2A illustrates a state where the brake button is spaced apart from the brake part by a predetermined distance before the brake button is touched, FIG. 2B illustrates a state where the brake button is touched by the brake part before the brake button is pressed, and FIG. 2C illustrates a state where the brake button is pressed by the brake part by a predetermined distance. In the present specification, based on the state illustrated in FIG. 2B, the spaced distance between the brake part and the brake button illustrated in FIG. 2A refers to a distance before touch, and the pressed distance of the brake button illustrated in FIG. 2C refers to a distance after touch.

Referring back to FIG. 1, the pre-touch information determining operation S20 is subsequently performed. Herein, the pre-touch information includes information on a distance before touch and information on a distance change rate before touch. The distance change rate before touch means a distance change rate over time, and may be considered as a gesture speed of a user. The reason for determining the pre-touch information is for determining the degree of braking intention of the user, and for example, when the distance change rate before touch is large, it may be determined that the user is willing to brake the vehicle urgently.

Next, the post-touch information determining operation S30 is performed. Herein, the post-touch information includes information on a distance after touch and information on a distance change rate after touch. The reason for determining the post-touch information is the same as the reason for determining the pre-touch information.

Next, the control operation S40 for braking by using the pre-touch information and the post-touch information is performed. The method using the pre-touch information and the post-touch information will be described below.

FIG. 3 is a graph illustrating a distance between the brake part of the user and the brake button, and a braking force relationship over time.

A process of touching the brake button is illustrated in an upper portion of FIG. 3, and a graph (time-touch graph) of a distance relationship between the braking part of the user and the brake button over time is illustrated in a middle portion of FIG. 3, and a graph (time-braking force) of a braking force relationship according to time is illustrated in a lower portion of FIG. 3. In the process of touching the brake button, state ① is the state where the brake part is spaced apart from the brake button by a predetermined distance, state ② is the state where the brake button is touched, and state ③ is the state where the brake button is pressed to a certain degree, and state ④ is the state where the brake button is completely pressed.

Referring to the time-distance graph of FIG. 3, D1 is a time-distance graph in the general braking situation, not emergency braking, D2 is a time-distance graph in the emergency braking situation in which pre-touch information is not considered, and D3 is a time-distance graph in the emergency braking situation in which pre-touch information is considered. In the emergency braking situation, the brake button is urgently pressed, so that the pressing speed of the brake button is larger than that of the general braking case.

Referring to graph D1, in the general braking situation, pre-touch information is not considered until a time point t_touch_on and post-touch information (information on the distance and the distance change rate) is presented as the brake button is pressed from a time point t_touch_on, and the brake button is completely pressed and the post-touch information is constantly presented from a time point t_full_1. An inclination presented in D1 from the time point t_touch_on to the time point t_full_1 means the pressing speed of the brake button in the general braking situation.

Referring to graph D2, in the emergency braking situation, pre-touch information is not considered until a time point t_touch_on and post-touch information is presented as the brake button is pressed from a time point t_touch_on, and the brake button is completely pressed and the post-touch information is uniformly presented from a time point t_full_2. In the meantime, in the emergency braking, the brake button is pressed faster compared to the general braking, so that the time point t_full_2 is earlier than the time point t_full_1, and the inclination in the emergency braking in the section in which the brake button is pressed is larger than the inclination in the general braking.

Referring to graph D3, D3 is the same as D2 in the emergency braking situation, but is different from D2 in that the pre-touch information is further considered. In particular, the pre-touch information is presented from the time point t1, and the contents from the time point t_touch_on are the same as those described in relation to D2. Herein, the reason why the pre-touch information is considered from the time point t1 at which the distance between the brake part of the user and the brake button is within a predetermined distance is to consider the pre-touch information from the time point at which the distance between the brake part and the brake button is within a specific distance.

In the exemplary embodiment of the present disclosure, it has been described that the time points t_touch_on of D1, D2, and D3 are the same, but the time point t_touch_on in D1 may be different from the time points t_touch_on of D2 and D3.

In the meantime, the braking control according to the exemplary embodiment of the present disclosure includes first braking control, second braking control, and third braking control. Herein, the first braking control is the control in which emergency braking is performed, but braking force is further added at a first time point, the second braking control is the control in which emergency braking is performed, but braking force is further added at a second time point that is later than the first time point, and the third braking control is the control in which general braking, not emergency braking, is performed. Herein, in the emergency braking control, the degree of braking force increase is controlled to be larger than that of the general braking control. In the meantime, an example of the control for adding braking force includes a Brake Assist System (BAS), but the present disclosure is not limited thereto, and various technologies for adding the braking force during the emergency braking are applicable.

Referring to the time-braking force graph of FIG. 3, B1 represents the third braking control, B21 represents the second braking control, B3 represents the first braking control, and B0 represents the emergency braking control. B1 is compared with the situation of D1, B2 is compared with the situation of D2, and B3 is compared with the situation of D3.

Referring to graph B1, in the emergency braking situation, the braking force is not generated until a time point t_touch_on, but the braking force is generated as the brake button is pressed from the time point t_touch_on, and the braking force is constantly maintained because the brake button is completely pressed from a time point t_full_1.

Referring to graph B2, in the emergency braking situation, the braking force is not generated until a time point t_touch_on, but the braking force increases along an inclination of the emergency braking B0 from the time point t_touch_on, and in this case, the braking force additionally increases from a time point t_default, and the braking force is constantly maintained because the brake button is completely pressed from a time point t_full_1. In the meantime, a threshold at which the braking force is added in the second braking control is Threshold_default.

Referring to graph B3, in the emergency braking situation, the braking force is not generated until a time point t_touch_on, but the braking force increases along the inclination of the emergency braking B0 from the time point t_touch_on, and in this case, the braking force additionally increases from a time point t_new and the braking force is constantly maintained before the time point t_full_1. In this case, the time point t_new is earlier than the time point t_default. In comparison with the second braking control, in the first braking control, when it is determined that there is an emergency braking will of the user according to the pre-touch information, the time point at which the braking force is added is controlled to be advanced. In the meantime, a threshold at which the braking force is added in the first braking control is Threshold_new.

As described above, in the first braking control according to the exemplary embodiment of the present disclosure, the threshold is lower (Threshold_new<Threshold_default) and the time point at which the braking force is added is earlier (t_new<t_default) compared to the second braking control, so that the first braking control is the control performed in the most urgent situation among the first to third braking controls.

Figure 4:
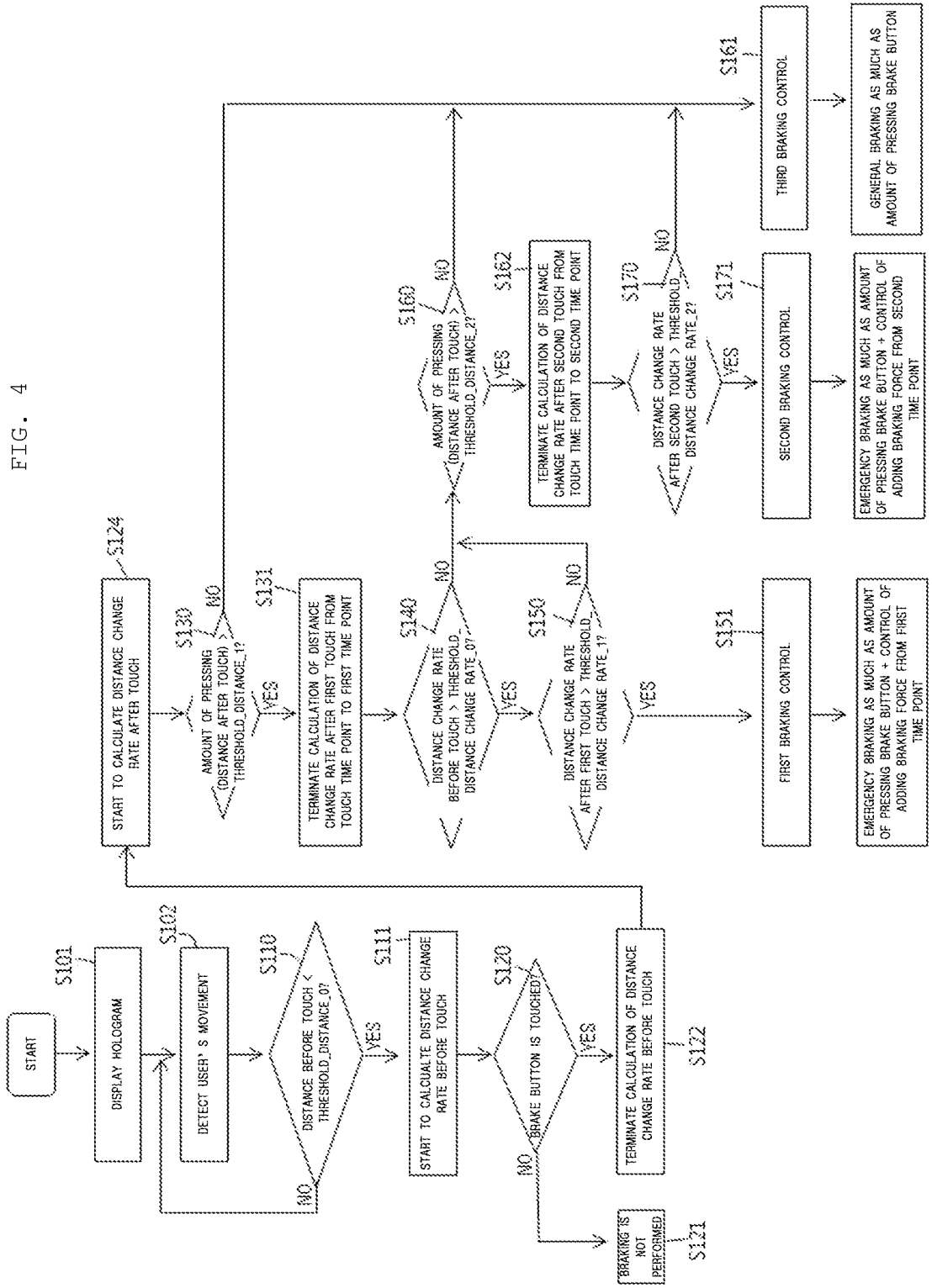
FIG. 4 is a flowchart illustrating the method of emergency braking of the vehicle according to the exemplary embodiment of the present disclosure.
Figure 5:
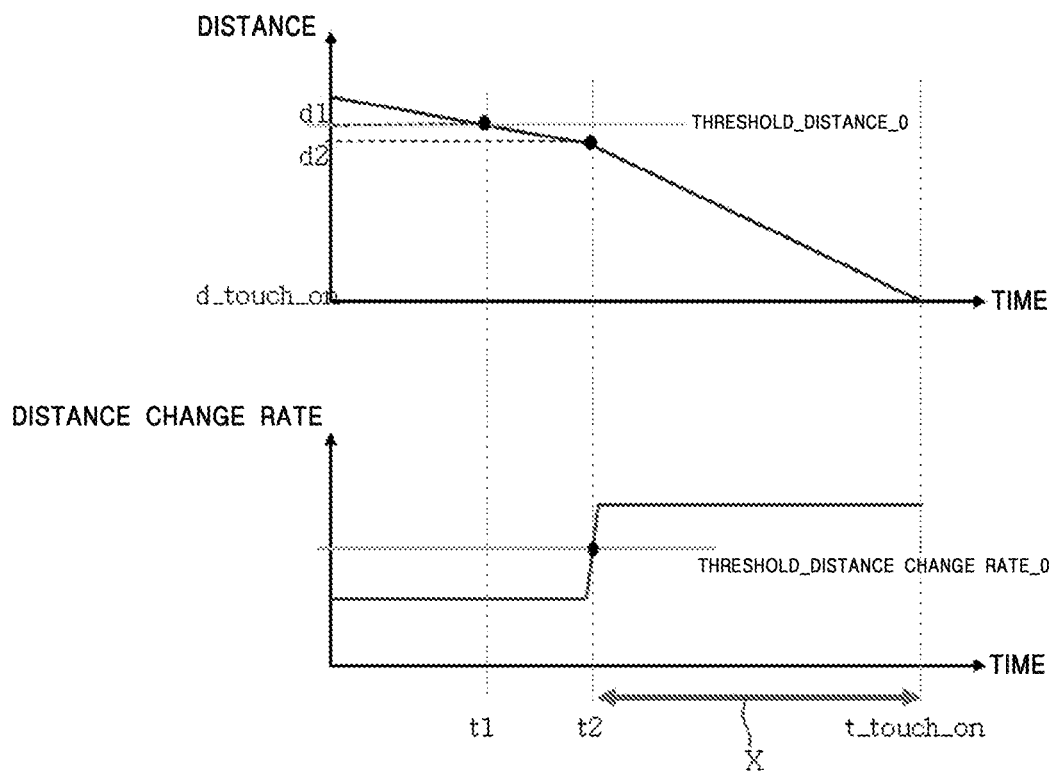
FIG. 5 is a graph illustrating pre-touch information according to the exemplary embodiment of the present disclosure.
Figure 6:
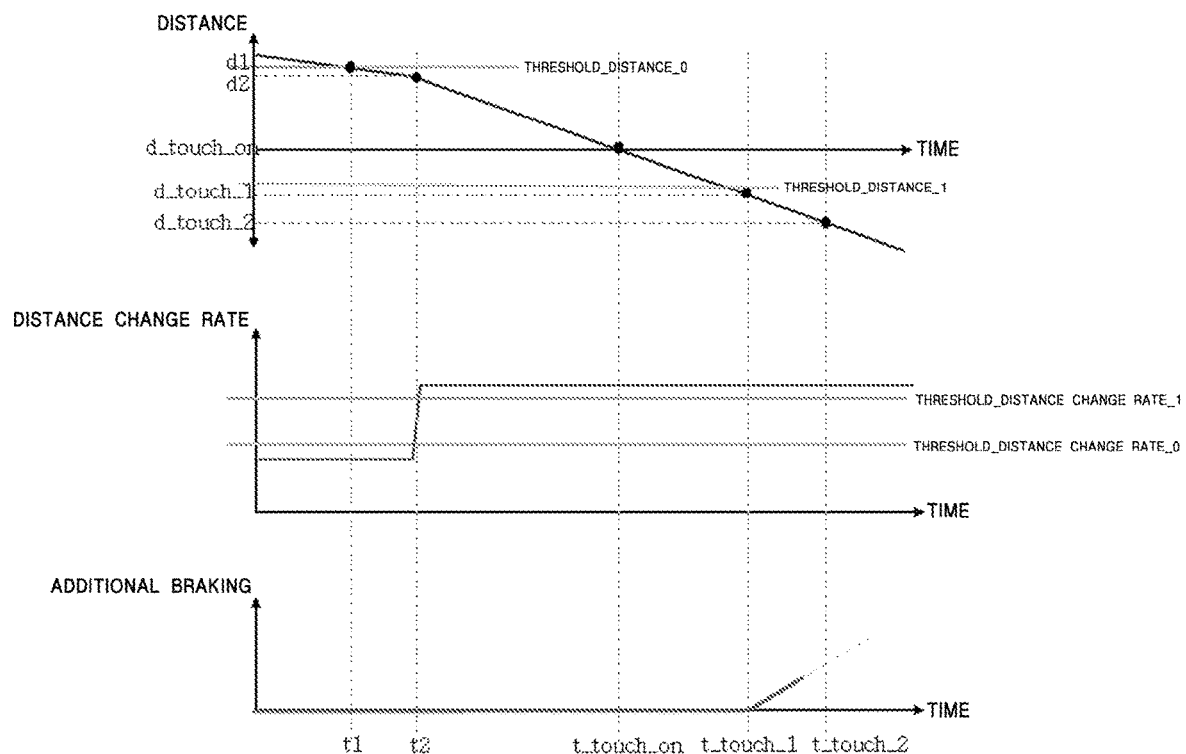
FIG. 6 is a graph illustrating information before and after a touch and additional braking of first braking control according to the exemplary embodiment of the present disclosure.
Figure 7:
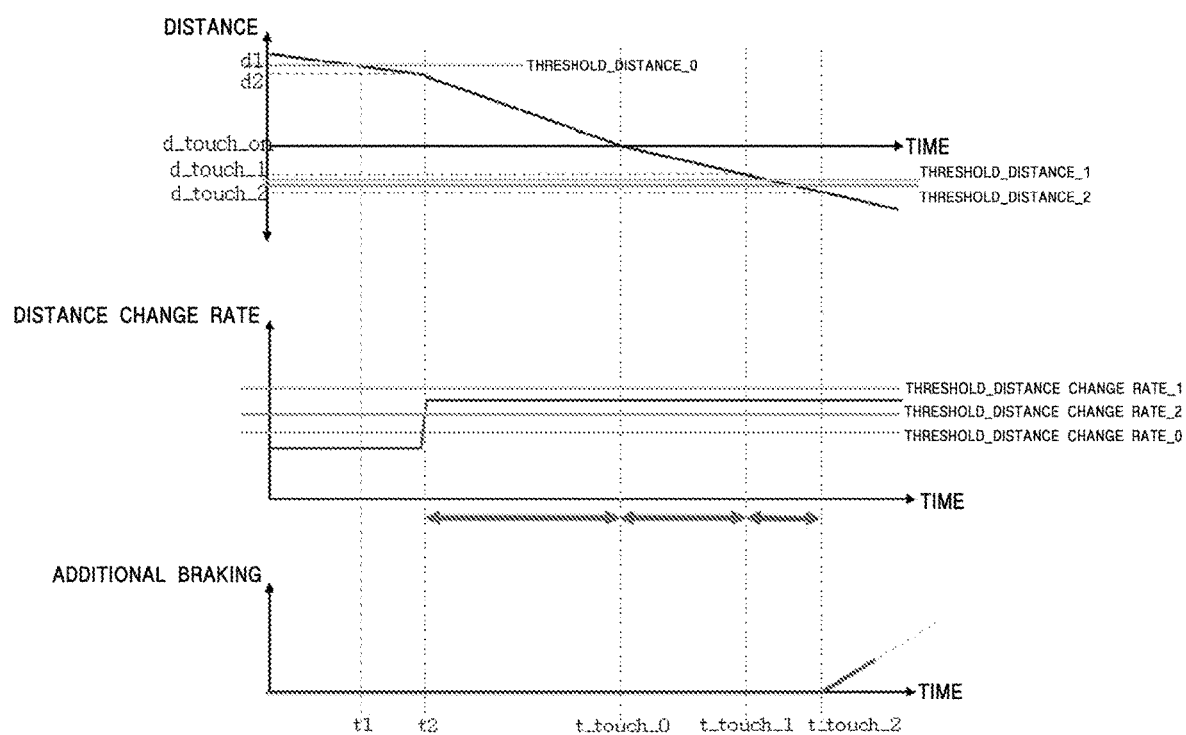
FIG. 7 is a graph illustrating information before and after a touch and additional braking of second braking control according to the exemplary embodiment of the present disclosure.

FIG. 4 is a flowchart illustrating the method of emergency braking of the vehicle according to the exemplary embodiment of the present disclosure, FIG. 5 is a graph illustrating pre-touch information according to the exemplary embodiment of the present disclosure, FIG. 6 is a graph illustrating information before and after a touch and additional braking of the first braking control according to the exemplary embodiment of the present disclosure, and FIG. 7 is a graph illustrating information before and after a touch and additional braking of the second braking control according to the exemplary embodiment of the present disclosure.

Hereinafter, a particular process of the method of emergency braking of a vehicle according to the exemplary embodiment of the present disclosure will be described with reference to FIGS. 4 to 7.

First, a brake button implemented in a 3D hologram image is displayed in a vehicle (S101). Then, a process of detecting a movement of a user in real time is performed in order to determine whether the user intends to touch the brake button (S102).

Next, a process of detecting a distance between a brake part of the user and the brake button and determining whether a distance before a touch is smaller than predetermined Threshold_distance_0 is performed (S110). This is for considering pre-touch information only when the brake part of the user enters a predetermined distance from the brake button.

Referring to the time-distance graph of FIG. 5, when the brake part of the user approaches the brake button and the time point t1 is reached, the distance between the brake part and the brake button is d1. Herein, a size of d1 is Threshold_distance_0, so that the pre-touch information is considered from this point.

When the distance before the touch is smaller than Threshold_distance_0, it is determined whether a distance change rate before the touch is larger than predetermined Threshold_distance change rate_0. This is for determining how fast the brake part of the user tries to touch the brake button. As illustrated in FIG. 5, the distance change rate before the touch at the time point t2 is larger than Threshold_distance change rate_0, so that it may be determined that the user has the intention of the emergency braking from this time. However, for reliability of the distance change rate before the touch, only when the time from the time point t2 to the time point t_touch_on (the brake button touch time point) is equal to or longer than predetermined time X, it may be determined that the user has the intention of emergency braking.

Referring back to FIG. 4, as described above, when the distance before the touch is smaller than Threshold_distance_0, the distance change rate before the touch starts to be calculated (S111), and it is determined whether the user touches the brake button (S120). When the user does not touch the brake button, the user does not have the intention of braking, so that braking is not performed (S121), when the user touches the brake button, the calculation of the distance change rate before the touch from the time point t2 to the time point t_touch_on of FIG. 5 is terminated (S122).

Then, since the brake button is touched, post-touch information is considered. A distance change rate after the touch in the post-touch information starts to be calculated from the time point at which the brake button is touched (S124). Then, it is determined whether the amount (the distance after the touch) of pressing the brake button by the brake part at a first time point is larger than the predetermined Threshold_distance_1 (S130). This may be the case where when the amount of pressing the brake button is smaller than Threshold_distance_1, the user does not intend to use the most urgent braking force. In FIG. 6, d_touch_1 that is the distance after the touch at the first time point t_touch_1 is larger than Threshold_distance_1, and in FIG. 7, d_touch_1 at the first time point t_touch_1 is smaller than Threshold_distance_1. When the distance after the touch is larger than Threshold_distance_1, the calculation of the distance change rate after the first touch from the touch time point t_touch_on to the first time point is terminated (S131).

Then, when the distance change rate before the touch is larger than Threshold_distance_0 (a first condition) (S140) and the distance change rate after the first touch is larger than Threshold_distance change rate_1 (a second condition) (S150), a first braking control condition is satisfied (S151). The first braking control is the control in which the emergency braking is performed as much as the user presses the brake button, and braking force is added from the first time point. Referring to FIG. 6, since the distance change rate before the touch from the time point t2 to the time point t_touch_on is larger than Threshold_distance change rate_0 and the distance change rate after the first touch at the time point t_touch_1 (the first time point) is larger than Threshold_distance change rate_1, the first braking control is performed. In this case, the braking force is added from the time point t_touch_1.

When any one of the first condition and the second condition is not satisfied, it is determined whether the amount (the distance after the touch) of pressing the brake button by the brake part at the second time point is larger than predetermined Threshold_distance_2 (S160). This may be the case where, when the amount of pressing the brake button is smaller than Threshold_distance_2, the user does not intend to use urgent braking force. In FIG. 7, d_touch_2 that is the distance after the touch at the second time point t_touch_2 is larger than Threshold_distance_2. When the distance after the touch is larger than Threshold_distance_2, the calculation of the distance change rate after the second touch from the touch time point t_touch_on to the second time point t_touch_2 is terminated (S162). In another exemplary embodiment of the present disclosure, the distance change rate after the second touch from the first time point to the second time point may also be calculated.

Then, it is determined whether the distance change rate after the second touch is larger than predetermined Threshold_distance change rate_2 (S170). When the distance change rate after the second touch is larger than the Threshold_distance change rate_2, the second braking control condition is satisfied (S171). The second braking control is the control in which the emergency braking is performed as much as the user presses the brake button, and braking force is added from the second time point. Referring to FIG. 7, since the distance change rate before the touch from the time point t2 to the time point t_touch_on is larger than Threshold_distance change rate_0 (the first condition is satisfied), but the distance change rate after the second touch at the time point t_touch_2 (the second time point) is smaller than Threshold_distance change rate_2 (the second condition is not satisfied), the second braking control is performed. In this case, the braking force is added from the time point t_touch_2.

In the meantime, when the amount of pressing the brake button is smaller than Threshold_distance_1 or Threshold_distance_2, or the distance change rate after the second touch is smaller than Threshold_distance change rate_2, the third brake control condition is satisfied (S161). In the third brake control, general braking force is controlled to be generated as much as the amount of pressing the brake button by the user.

According to the present disclosure, the braking force generation control is performed by considering both the information before and after the touch of the brake button, so that it is possible to generate braking force from an early time in an emergency in which emergency braking is required, thereby preventing safety accidents.

The present disclosure can also be embodied as computer readable code on a computer readable recording medium. The computer readable recording medium is any data storage device that can store data which can thereafter be read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy disks, and optical data storage devices.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy [disks]discs, [and]optical data storage devices[.], etc and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

While this disclosure has been described in connection with the limited exemplary embodiments and drawings, the disclosure is not limited thereto, and it is obvious that various changes and modifications within the technical spirit of the present disclosure and the scope equivalent to the scope of the appended claims may be made by those skilled in the art.

What is claimed is:

1. A method of emergency braking of a vehicle, which includes a processor configured to perform functions of the method, the method comprising:
   a display operation for displaying a brake button implemented in a hologram in the vehicle;
   a pre-touch information determining operation for determining a degree of a first emergency braking intention before a user touches the brake button, by using information on a pre-touch distance, which is a distance between the brake button and a brake part of the user before the brake button is touched by the user, and information on a first change rate of the pre-touch distance;
   a post-touch information determining operation for determining a degree of a second emergency braking intention after the user touches the brake button, by using information on a post-touch distance, which is a pressing distance of the brake button by the user after the brake button is touched, and information on a second change rate of the post-touch distance; and
   a control operation for performing, according to the pre-touch information and the post-touch information, any one of a first brake control in which general braking is performed according to a degree of pressing of the brake button and braking force is added from a first time point after the brake button is pressed, a second brake control in which the general braking is performed and braking force is added from a second time point that is after the first time point, and a third brake control in which the general braking is performed.

2. The method of claim 1, wherein the pre-touch information determining operation includes calculating the first change rate from a time point at which the pre-touch distance is smaller than a first predetermined distance.

3. The method of claim 1, further comprising a first comparing operation for comparing the first change rate with a first predetermined change rate in order to determine whether the user has the first emergency braking intention.

4. The method of claim 3, wherein the first comparing operation includes determining that the user has the first emergency braking intention only when the first change rate is maintained to be larger than the first predetermined change rate for a specific period of time from a predetermined time point before the brake button is touched to a time point at which the brake button is touched.

5. The method of claim 1, wherein the second change rate is calculated from a time point at which the brake button is touched.

6. The method of claim 4, wherein the post-touch information determining operation includes, when the brake button is pressed so that the post-touch distance is larger than a second predetermined distance, calculating a third change rate of the distance after first touch from the time point at which the brake button is touched to the first time point corresponding to the second predetermined distance.

7. The method of claim 6, further comprising a second comparing operation for comparing the third change rate with a second predetermined change rate in order to determine whether the user has a third emergency braking intention at the first time point after the user touches the brake button.

8. The method of claim 7, wherein the post-touch information determining operation includes, when the brake button is pressed so that the distance after the touch is larger than a third predetermined distance, calculating a fourth change rate of the distance after second touch from the time point at which the brake button is touched to the second time point corresponding to the third predetermined distance.

9. The method of claim 8, further comprising a third comparing operation for comparing the fourth change rate with a third predetermined change rate in order to determine whether the user has a fourth emergency braking intention at the second time point after the user touches the brake button.

10. The method of claim 9, wherein the third comparing operation is performed when the first change rate is smaller than the first predetermined change rate or when the third change rate is smaller than the second predetermined change rate.

11. The method of claim 7, wherein the control operation includes, when the first change rate is larger than the first predetermined change rate and the third change rate is larger than the second predetermined change rate, performing the first brake control.

12. The method of claim 9, wherein the control operation includes, when the fourth change rate is larger than the third predetermined change rate, performing the second brake control.

13. The method of claim 8, wherein the control operation includes, when the third change rate is smaller than the second predetermined change rate or the fourth change rate is smaller than the third predetermined change rate, performing the third brake control.

* * * * *